US012758051B2

(12) United States Patent
Banasik et al.

(10) Patent No.: US 12,758,051 B2
(45) Date of Patent: Oct. 13, 2026

(54) DUAL LANE TOASTER

(71) Applicant: Marmon FoodserviceTechnologies, Inc., Osseo, MN (US)

(72) Inventors: Greg Banasik, Arlington Heights, IL (US); Forrest Duvick, DeKalb, IL (US); Marcus Frio, St. Charles, IL (US); Kyle Kestner, Schaumburg, IL (US); Rich Bauer, Palatine, IL (US); Rick Saiz, Naperville, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 609 days.

(21) Appl. No.: 18/365,736

(22) Filed: Aug. 4, 2023

(65) Prior Publication Data

US 2024/0049912 A1 Feb. 15, 2024

Related U.S. Application Data

(60) Provisional application No. 63/371,333, filed on Aug. 12, 2022.

(51) Int. Cl.
*A47J 37/08* (2006.01)
*A47J 27/00* (2006.01)
*A47J 27/14* (2006.01)

(52) U.S. Cl.
CPC ......... *A47J 37/0857* (2013.01); *A47J 27/004* (2013.01); *A47J 27/14* (2013.01); *A47J 37/0807* (2013.01)

(58) Field of Classification Search
CPC ........ A47J 27/004; A47J 27/14; A47J 37/044; A47J 37/08; A47J 37/0807; A47J 37/0857
USPC ............................................................ 99/325
See application file for complete search history.

(56) References Cited

U.S. PATENT DOCUMENTS

| | | | |
|---|---|---|---|
| 4,286,509 | A | 9/1981 | Miller et al. |
| 4,389,562 | A | 6/1983 | Chaudoir |
| 4,421,015 | A | 12/1983 | Masters et al. |
| 4,441,003 | A | 4/1984 | Eves, II et al. |

(Continued)

FOREIGN PATENT DOCUMENTS

| | | | | |
|---|---|---|---|---|
| CA | 2228449 | C | * 12/2001 | .......... A47J 37/0864 |
| CA | 2303625 | C | * 10/2009 | |

(Continued)

OTHER PUBLICATIONS

Extended European Search Report for European Patent Application No. 23191010.0, dated Dec. 13, 2023.

(Continued)

*Primary Examiner* — Atul Trivedi
(74) *Attorney, Agent, or Firm* — Andrus Intellectual Property Law, LLP

(57) ABSTRACT

A toaster includes first and second conveyors configured to each receive a bread product thereon and move the bread product through respective first and second toasting zones. A first heat source is positioned to direct heat energy into the first toasting zone. A second heat source is positioned to direct heat energy into the second toasting zone. The first and second conveyors are coplanar and laterally spaced apart by a first distance and are configured to operate in a same direction of travel. Interior extents of the first heat source and the second heat source are laterally spaced apart by a second distance.

20 Claims, 9 Drawing Sheets

(56) References Cited

U.S. PATENT DOCUMENTS

| | | | | |
|---|---|---|---|---|
| 5,179,265 | A | 1/1993 | Sheridan et al. | |
| 5,821,503 | A | 10/1998 | Witt | |
| 6,006,656 | A | 12/1999 | Lulofs et al. | |
| 6,223,650 | B1 * | 5/2001 | Stuck | A47J 37/0857 99/393 |
| 6,252,201 | B1 * | 6/2001 | Nevarez | A21B 1/48 219/400 |
| 6,481,433 | B1 | 11/2002 | Schjerven, Sr. et al. | |
| 6,624,396 | B2 | 9/2003 | Witt et al. | |
| 6,655,373 | B1 | 12/2003 | Wiker | |
| 6,684,875 | B1 | 2/2004 | Schjerven, Sr. et al. | |
| 6,707,014 | B1 | 3/2004 | Corey et al. | |
| 7,222,738 | B1 | 5/2007 | Stockard | |
| 7,340,992 | B1 | 3/2008 | Wolfe et al. | |
| 7,541,559 | B2 | 6/2009 | Milz | |
| 7,592,570 | B2 | 9/2009 | Yoder et al. | |
| 7,954,422 | B2 | 6/2011 | Nevarez et al. | |
| 7,997,189 | B1 | 8/2011 | Baker et al. | |
| 8,076,614 | B2 | 12/2011 | Baker et al. | |
| 8,087,407 | B2 | 1/2012 | Wiker et al. | |
| 8,109,202 | B2 | 2/2012 | Nevarez et al. | |
| 8,113,190 | B2 | 2/2012 | Doughterty | |
| 8,188,408 | B2 * | 5/2012 | Claesson | A47J 37/045 700/211 |
| 8,210,100 | B2 | 7/2012 | Nevarez et al. | |
| 8,272,320 | B2 | 9/2012 | Baker et al. | |
| 8,281,779 | B2 | 10/2012 | Wiker et al. | |
| 8,371,285 | B2 | 2/2013 | Wiker et al. | |
| 8,413,646 | B2 | 4/2013 | Wiker et al. | |
| 8,474,370 | B2 | 7/2013 | Nevarez et al. | |
| 8,839,714 | B2 | 9/2014 | Schjerven, Sr. et al. | |
| 8,839,779 | B2 | 9/2014 | Wiker et al. | |
| 8,863,652 | B2 | 10/2014 | Nevarez et al. | |
| 9,049,875 | B2 | 6/2015 | Ewald et al. | |
| 9,097,430 | B2 | 8/2015 | Stanger | |
| 9,320,284 | B2 | 4/2016 | Van Camp et al. | |
| 9,516,704 | B2 | 12/2016 | Stanger | |
| 9,585,400 | B2 | 3/2017 | Wiker et al. | |
| 9,585,401 | B2 | 3/2017 | Wiker et al. | |
| 9,609,981 | B2 | 4/2017 | Schjerven, Sr. et al. | |
| 10,004,358 | B2 | 6/2018 | Wildebush | |
| 10,024,548 | B2 | 7/2018 | Wiker et al. | |
| 10,036,558 | B2 | 7/2018 | Wiker et al. | |
| 10,039,289 | B2 | 8/2018 | Wiker et al. | |
| 10,123,543 | B2 | 11/2018 | Schjerven, Sr. et al. | |
| 10,258,194 | B2 | 4/2019 | Patel et al. | |
| 10,278,540 | B1 * | 5/2019 | Huggins | A47J 37/0857 |
| 10,362,898 | B2 | 7/2019 | Schjerven, Sr. et al. | |
| 10,660,466 | B2 | 5/2020 | Yazvin et al. | |
| 10,746,410 | B2 | 8/2020 | Wiker et al. | |
| 10,758,085 | B2 | 9/2020 | Wildebush | |
| 10,791,590 | B2 | 9/2020 | Scanlon | |
| 10,842,156 | B2 | 11/2020 | Wiker et al. | |
| 10,900,655 | B2 | 1/2021 | Scanlon et al. | |
| 11,284,745 | B2 | 3/2022 | Shei et al. | |
| 2001/0022178 | A1 | 9/2001 | Knost | |
| 2005/0205547 | A1 | 9/2005 | Wenzel | |
| 2009/0175994 | A1 * | 7/2009 | Chung | A47J 37/0807 426/466 |
| 2010/0139497 | A1 * | 6/2010 | Chung | A47J 37/045 99/386 |
| 2010/0239724 | A1 | 9/2010 | Veltrop et al. | |
| 2010/0275789 | A1 * | 11/2010 | Lee | A47J 37/0857 99/386 |
| 2011/0114634 | A1 | 5/2011 | Nevarez | |
| 2011/0277643 | A1 | 11/2011 | Schwierking et al. | |
| 2011/0303100 | A1 * | 12/2011 | Agnello | A47J 37/0807 165/104.19 |
| 2012/0121782 | A1 * | 5/2012 | Veltrop | A47J 37/0857 426/505 |
| 2013/0133526 | A1 * | 5/2013 | Shealy | A47J 37/06 99/325 |
| 2013/0306616 | A1 * | 11/2013 | Wildebush | A47J 37/0857 219/413 |
| 2014/0199446 | A1 * | 7/2014 | Huegerich | A47J 37/0871 426/233 |
| 2014/0318382 | A1 * | 10/2014 | Hombeck | A47J 36/32 99/332 |
| 2015/0118378 | A1 | 4/2015 | Jones et al. | |
| 2015/0150270 | A1 * | 6/2015 | Barnett | A21D 6/003 34/443 |
| 2015/0272387 | A1 | 10/2015 | Stanger | |
| 2016/0296068 | A1 | 10/2016 | Schjerven, Sr. et al. | |
| 2016/0327279 | A1 | 11/2016 | Bhogal et al. | |
| 2017/0095112 | A1 | 4/2017 | Baker et al. | |
| 2017/0148376 | A1 | 5/2017 | Yoo et al. | |
| 2018/0000284 | A1 * | 1/2018 | Adomaitis | H05B 6/107 |
| 2018/0289209 | A1 * | 10/2018 | Yazvin | A47J 27/14 |
| 2018/0296035 | A1 | 10/2018 | Wildebush | |
| 2018/0317709 | A1 * | 11/2018 | Leach | A47J 37/0835 |
| 2018/0338354 | A1 | 11/2018 | Bassill et al. | |
| 2019/0113229 | A1 | 4/2019 | Schjerven, Sr. et al. | |
| 2019/0274315 | A1 * | 9/2019 | Newhouse | A21B 1/26 |
| 2019/0320846 | A1 | 10/2019 | Nevarez et al. | |
| 2019/0353527 | A1 | 11/2019 | Bassill et al. | |
| 2020/0037616 | A1 | 2/2020 | Schjerven, Sr. et al. | |
| 2020/0196614 | A1 | 6/2020 | Schjerven, Sr. et al. | |
| 2020/0288912 | A1 | 9/2020 | Shei et al. | |
| 2020/0337499 | A1 * | 10/2020 | Tsui | A47J 37/0611 |
| 2021/0059472 | A1 * | 3/2021 | Shei | A47J 37/0842 |
| 2021/0085125 | A1 | 3/2021 | Shei | |
| 2021/0127688 | A1 * | 5/2021 | Sammon | G05D 23/1917 |
| 2021/0127898 | A1 | 5/2021 | Sammon et al. | |
| 2021/0298526 | A1 * | 9/2021 | Lyons | A47J 37/0857 |

FOREIGN PATENT DOCUMENTS

| | | | | | |
|---|---|---|---|---|---|
| EP | 2127482 | B1 | * | 4/2014 | D06F 58/266 |
| EP | 4270338 | A1 | * | 11/2023 | G07F 9/009 |
| EP | 4321070 | A1 | * | 2/2024 | A47J 37/0857 |
| ES | 2936382 | A1 | * | 3/2023 | B26D 3/28 |
| GB | 2527780 | A | * | 1/2016 | A47J 37/0814 |
| KR | 101355907 | | | 1/2014 | |
| WO | WO-2008073320 | A2 | * | 6/2008 | A47J 37/0857 |
| WO | WO-2016126843 | A1 | * | 8/2016 | A23L 5/15 |
| WO | WO-2019113429 | A1 | * | 6/2019 | H05B 6/6485 |
| WO | 2020122904 | | | 6/2020 | |
| WO | 2020142285 | | | 7/2020 | |

OTHER PUBLICATIONS

Hatco Corporation Intelligent Toast-Qwik Conveyor Toaster Installation and Operating Manual, 2017 Hatco Corporation.

Nieco FH94 Flame Broiler Back of House Model Sell Sheet.

Nieco FH94G Gas Owner's Manual, 2020 Nieco Corporation.

* cited by examiner

DUAL LANE TOASTER

CROSS-REFERENCE TO RELATED APPLICATIONS

This application claims priority of U.S. Provisional Patent Application No. 63/371,333, filed on Aug. 12, 2022, which is hereby incorporated by reference in its entirety.

BACKGROUND

The present disclosure is related to toasting. More specifically, the present disclosure relates to an apparatus and control of an apparatus configured for toasting multiple food items.

Many restaurants serve toasted bread or English muffins as regular menu items. Many other menu items include sandwiches that are comprised of toasted baked goods including toasted bread, bagels, buns, or English muffins.

Toasted food products have a distinctly different flavor than the same products before toasting. Toasting a food product also changes the bread product's color and texture. In addition to changing flavor, color, and texture, the toasting process often gives off a pleasing aroma.

Food products, for example, sliced bread, English muffins, bagels, pizza crust, other baked goods, or prepared food products, for example, pizzas or sandwiches, are usually toasted using radiant and/or conductive energy transfer into the baked good from one or more heat sources. The process of toasting is the result of a chemical reaction known as the Maillard reaction. The Maillard reaction is the reaction between carbohydrates and proteins that occurs upon heating and which produces changes in the color and texture of the baked good.

When the Maillard reaction goes too far or too long, carbohydrates in a bread product will oxidize completely and form carbon. Carbon absorbs light. The surface of a burned bread product, therefore, appears black. The term "burn" is therefore considered to be the thermally-induced oxidation of carbohydrates to a point where the carbon content of the bread product surface is high enough to absorb visible light that impinges on the bread product surface and therefore makes the surface of the bread product appear to an ordinary observer to be black in color.

There are a large variety of toasters that exist and are used in the industry. A platen toaster uses a vertical or near-vertical heating platen and a slowly rotating conveyor which urges a food product against the platen while it simultaneously drags a food product downwardly and across the platen's hot surface. The toasting process is terminated by the conveyor moving the food product beyond contact with the platen. A conveyor toaster is conventionally oriented horizontally with (natural) gas-fired burners or equivalent electrical heat sources arranged above and/or below a conveyor upon which the food product to be toasted is moved through the toaster. The toasting process is terminated by the conveyor moving the food product beyond the heat sources. In an example of an oven toaster, the food product is held within the toaster in a fixed position relative to one or more heating sources which direct heat energy towards the food product. The toasting process is terminated by turning off the heat sources and/or removing the food product from the toaster.

Examples of technology that may be used in the toasting of bread products include U.S. Pat. No. 10,660,466, entitled "Toaster with Adjustable Conveyor"; U.S. Pat. No. 11,284,745, entitled "Infrared Toaster"; US Patent Application Publication No. 2020/288912, entitled "Infrared Toaster"; US Patent Application Publication No. 2021/0059472, entitled "Latent Heat Toaster Control"; US Patent Application Publication No. 2021/0085125, entitled "Vertical Heat Transfer Device"; and US Patent Application Publication No. 2021/0127898, entitled "Cooking Appliance with Cooked Food Holding Apparatus," which are each hereby incorporated by reference in their entireties.

BRIEF DISCLOSURE

An example of a toaster for toasting a bread product. The toaster includes a first conveyor and a second conveyor. A first heat source is arranged relative to the first conveyor and a second heat source is arranged relative to the second conveyor. A controller is configured to receive a first user input, a second user input, and a third user input. Upon receipt of the first user input, the controller operates the first conveyor to a first speed. Upon receipt of the second user input, the controller operates the second conveyor to a second speed. Upon receipt of the third user input, the controller operates the first and second conveyors to a third conveyor speed.

In further examples of the toaster, the first speed and/or the second speed are different from the third speed. A housing may define an open interior and an opening through the housing. The first and second conveyors extend within the open interior of the housing and extend exterior of the housing through the opening. The first conveyor may be spaced apart from the second conveyor by a first distance in the width dimension. The first heat source may be spaced apart from the second heat source by a second distance in the width dimension. The second distance may be less than the first distance. An open interior of the housing may be unobstructed between a toasting zone on the first conveyor and a toasting zone on the second conveyor.

An example of a toaster for toasting a bread product in a toasting process includes a first conveyor configured to receive the bread product thereon and move the bread product through a first toasting zone. A first heat source is positioned to direct heat energy into the first toasting zone. A second conveyor is configured to receive the bread product thereon and move the bread product through a second toasting zone. The first and second conveyors are coplanar and laterally spaced apart by a first distance and are configured to operate in a same direction of travel. A second heat source is positioned to direct heat energy into the second toasting zone. Interior extents of the first heat source and the second heat source are laterally spaced apart by a second distance. The second distance is less than the first distance. A controller is configured to operate the first conveyor to at least a first speed and a second speed and configured to operate the second conveyor to at least the first speed and the second speed.

In examples of the toaster, the first and second heat sources are electric heating elements which each include a plurality of interior loops and a plurality of exterior loops. The plurality of interior loops may include first and second end interior loops and at least one intermediate interior loop. The end interior loops of the first and second heat sources are laterally spaced apart by the second distance. The at least one intermediate interior loop of the first and second heat sources are laterally spaced apart by a third distance. The third distance is greater than the first distance and the second distance. The first and second conveyors may each include a drive shaft, a driven shaft, and a continuous belt. A housing defines an open interior and an opening through the housing.

The first and second conveyors extend within the open interior of the housing and extend exterior of the housing through the opening. The open interior of the housing is unobstructed between the toasting zone on the first conveyor and the toasting zone on the second conveyor. A graphical display is operable by the controller to present a graphical user interface operable to receive user inputs. Upon receipt of a first user input, the controller operates the first heat source to a first heat output, and upon receipt of a second user input, the controller operates the second heat source to a second heat output, and upon receipt of a third user input, the controller operates the first heat source and the second heat source to a third heat output.

In other examples of the toaster, the first heat source is positioned interior of the first conveyor and the second heat source is positioned interior of the second conveyor. A third heat source is positioned above the first conveyor. A fourth heat source is positioned above the second conveyor. The third and fourth heat sources are laterally spaced apart by the second distance. The first, second, third, and fourth heat sources are electric heating elements which each include a plurality of interior loops and a plurality of exterior loops. The plurality of interior loops of the electric heat sources of the third and fourth heat sources include first and second end interior loops and at least one intermediate interior loop. The end interior loops of the first and second heat sources are laterally spaced apart by the second distance. At least one intermediate interior loop of the third and fourth heat sources are laterally spaced apart by a third distance. The third distance is greater than the first distance and the second distance. The plurality of interior loops of each of the electric heat sources include first and second end interior loops and at least one intermediate interior loop. The first and second end interior loops of the first heat source are laterally spaced apart from the first and second end interior loops of the second heat source by the second distance. The first and second end interior loops of the third heat source are laterally spaced apart from the first and second end interior loops of the fourth heat source by a third distance. The at least one intermediate interior loop of the first heat source is laterally spaced apart from the at least one intermediate interior loop of the second heat source by a fourth distance The fourth distance is greater than the first, second, and third distances. The at least one intermediate interior loop of the third heat source is laterally spaced apart from the at least one intermediate interior loop of the fourth heat source by a fifth distance, the fifth distance being greater than the first, second, and third distances.

In still further examples of the toaster, the toaster includes first and second side supports and first and second interior supports. The first conveyor is connected to the first side support and the first interior support and the second conveyor is connected to the second side support and the second interior support. The first and second interior supports may be of unitary construction. The first and second heat sources may be electric heating elements each of which includes a plurality of interior loops and a plurality of exterior loops. The first interior support includes a first plurality of apertures. The interior loops of the first heat source extend interior of the first interior support through the first plurality of apertures. The second interior support includes a second plurality of apertures. The interior loops of the second heat source extend interior of the second interior support through the second plurality of apertures. The first plurality of apertures are open through the first interior support towards the first conveyor from the first heat source and the second plurality of apertures are open through the second interior support towards the second conveyor from the second heat source.

An example of a toaster for toasting a bread product includes a first conveyor configured to receive the bread product thereon and move the bread product through a first toasting zone. A first electric heating element extends interior of the first conveyor and includes a first plurality of interior loops and a first plurality of exterior loops. A second conveyor is configured to receive the bread product thereon and move the bread product through a second toasting zone. The first and second conveyors are coplanar and laterally spaced apart by a first distance and are configured to operate in a same direction of travel. A second electric heating element extends interior of the second conveyor and includes a second plurality of interior loops and a second plurality of exterior loops. The first plurality of interior loops are laterally spaced apart from the second plurality of interior loops by a second distance. The second distance is less than the first distance. A third electric heating element is positioned above the first conveyor and includes a third plurality of interior loops having two end interior loops and at least one intermediate interior loop. The third electric heating element includes a third plurality of exterior loops. A fourth electric heating element is positioned above the second conveyor and includes a fourth plurality of interior loops having two end interior loops and at least one intermediate interior loop. The fourth electric heating element includes a fourth plurality of exterior loops. The at least one intermediate interior loop of the third electric heating element is laterally spaced apart from the at least one intermediate interior loop of the fourth electric heating element by a third distance. The third distance is greater than the first distance and the second distance.

In a further example, the first plurality of interior loops has two end interior loops and at least one intermediate interior loop and the second plurality of interior loops has two end interior loops and at least one intermediate interior loop. The at least one intermediate interior loop of the first electric heating element is laterally spaced apart from the at least one intermediate interior loop of the second electric heating element by a fourth distance. The fourth distance is greater than the first distance and the second distance.

DETAILED DISCLOSURE

Restaurant menus often include a variety of bread products, either as individual items (e.g. toast, English muffin, bagel) or as a component of a sandwich (e.g. sliced baked goods including bread, bagels, croissant, rolls, or buns).

Preparation of such menu items may require toasting all or a portion of these bread products before serving to a customer. While an oven toaster may be reconfigurable for each toasting item or cycle, oven toasters are limited in output to individual items or batches of items. A subsequent item or batch of items cannot be started until a prior item or batch has completed toasting. Conveyor-type toasters offer greater product throughput. Toaster systems as described herein provide greater operational flexibility and control to a conveyor toaster. Such improved flexibility and control enable a conveyor toaster to provide toasting of a wider variety of baked goods requiring different toasting conditions.

Figure 1:
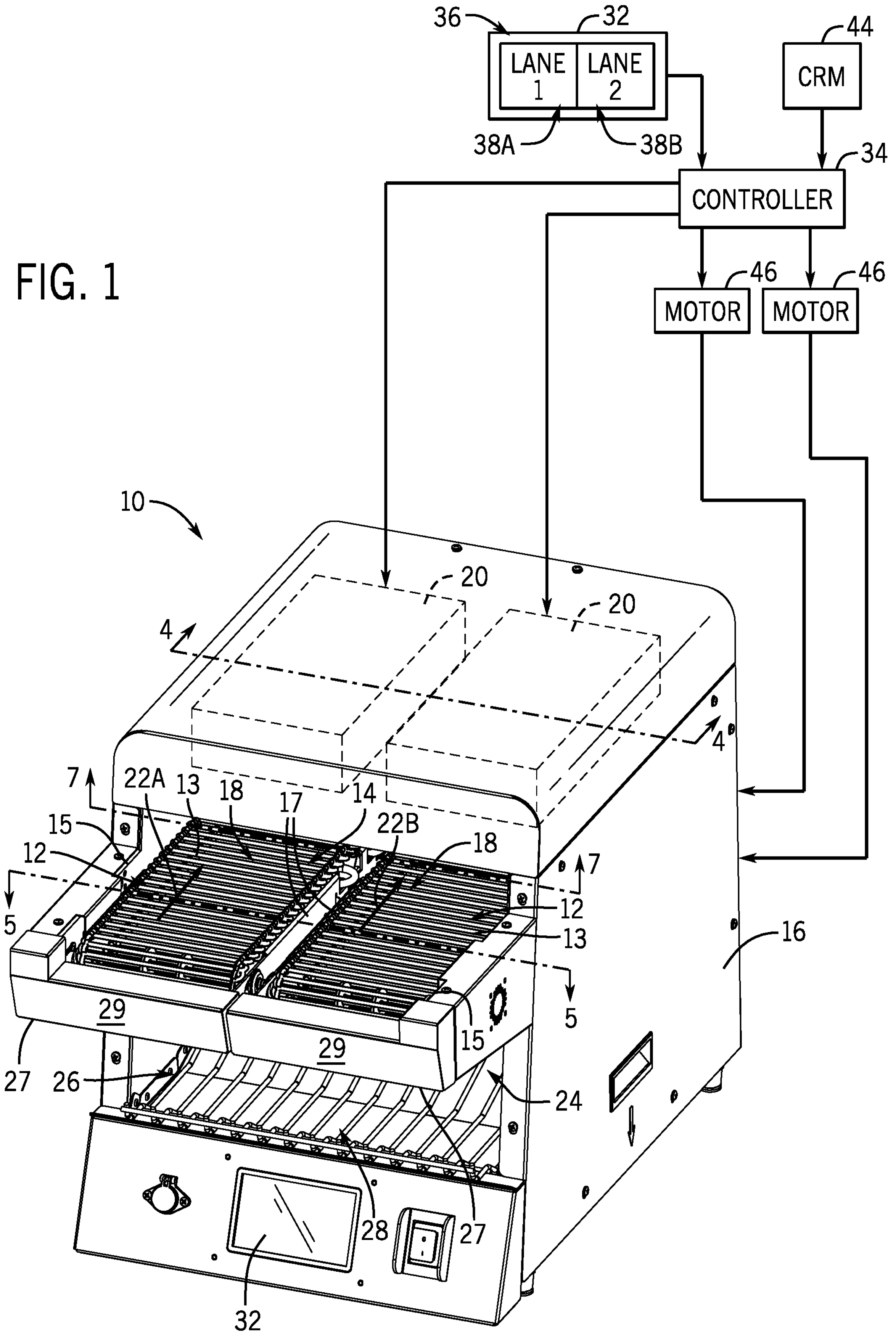
FIG. 1 is a system diagram of an exemplary embodiment of a toaster.

FIG. 1 depicts an example of a toaster 10 in partial physical and schematic representation. The toaster 10 exemplarily includes two conveyors 12. The conveyors 12 include continuous belts 13 which may exemplarily be constructed of metal or silicone. Metal belts may exemplarily be constructed of wire links or metal slats. Belts 13 may be constructed in other manners as may be recognized. The conveyors 12 project outward through an opening 14 in a housing 16 of the toaster 10. The conveyors 12 thus are partially within the housing 16 and partially exterior of the housing 16. The portions of the conveyors 12 exterior of the housing 16 form a loading zone 18 upon which a baked good to be toasted is placed on one or both conveyors 12. As shown and described herein, each conveyor 12 defines a lane 22A, 22B along which baked goods are moved through the toaster 10.

The conveyors 12 further include side supports 15 and interior supports 17. The interior supports 17 are laterally spaced apart by a distance indicated with reference 65. This same distance of reference 65 may laterally separate the conveyors 12. In an example, the interior supports 17 are a unitary construction having a U shape and defining a space between the sides forming the interior supports 17. As is shown in better detail in FIGS. 5-7, the side supports 15 and interior supports 17 function to support both a drive shaft 19 inside the housing 16 and a driven shaft 21 outside of the housing 16. The conveyor belt 13 extends around the drive shaft 19 and the driven shaft 21. The side supports 15 include one or more side support flanges 23 upon which an interior surface of an upper side of the conveyor belt 13 rests. The interior supports 17 include one or more interior support flanges 25 upon which the interior surface of the upper side of the conveyor belt 13 slides while in motion. Respective crumb trays 27 extend below at least a portion of each of The conveyors 12 pure the crumb trays 27 include handles 29 which facilitate sliding removal of the crumb trays 27 as well as partially enclose the conveyors 12 to the front of the toaster 10.

Figure 2:
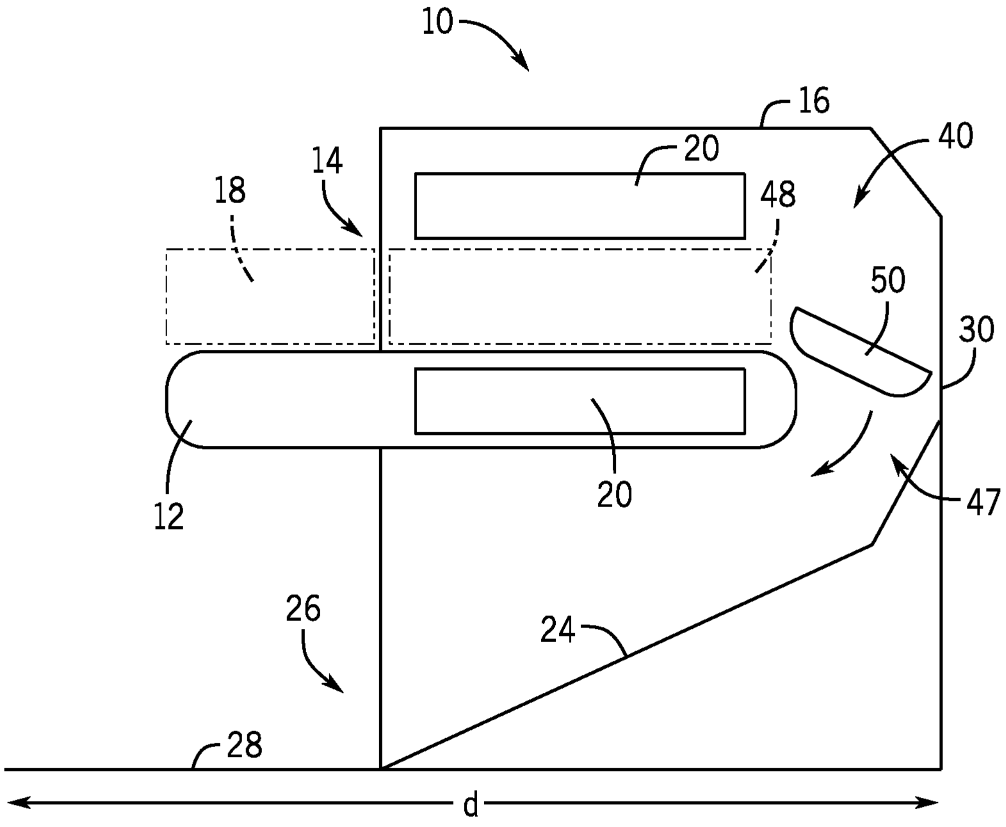
FIG. 2 is a schematic cross-sectional view of the toaster.

FIG. 2 is a schematic cross-sectional view of the toaster 10. The conveyor 12 receives a bread product 50 at the loading zone 18 and moves the bread product through a toasting zone 48 past at least one heat source 20 positioned relative to the conveyor 12. The examples provided herein include at least two heat sources, positioned above and below the toasting zone 48. In examples, a lower heat source 20 is positioned interior of the conveyor 12 as will be described in further detail herein. Further examples provide heat sources above and below the toasting zone 48 of each conveyor 12. The at least one heat source 20 may be any of a variety of heat sources including resistive wire, electric tubular heaters, gas combustion, IR burners, LED, or others as will be recognized by one of ordinary skill in the art. In an example, the toaster 10 may use heat sources that are exemplarily electric tubular heaters, for example, CAL-ROD® electric tubular heaters which produce radiant heat. The heat sources 20 are arranged to direct radiant heat at a bread product. In the embodiment depicted in FIG. 1, and as will be explained in further detail herein, the heat sources 20 may be configured and/or operated to either simultaneously toast both sides of the bread product or may be configured and/or operated such that one heat source 20 provides a toasting heat, while the other heat source directs supplemental heat energy towards the bread product and/or the toasting zone 48 to improve the efficiency of the toasting process.

Once the conveyor 12 moves the bread product through the toasting zone 48, the now toasted bread product 50 falls from the conveyor 12 onto a discharge ramp 24 and slides down the discharge ramp 24 to an outlet 26 of the toaster 10. The toaster 10 may further include a landing zone 28 at the outlet 26. Toasted bread products may collect upon the landing zone 28 or in a pan or tray (not depicted) placed on the landing zone 28 relative to the outlet 26. With countertop space at a premium in a kitchen layout, a depth dimension (d) of the toaster may limit the size of the space 47 between the conveyor 12 and a back wall 30 of the housing 16 and/or the discharge ramp 24 through which the toasted bread product 50 must pass. This clearance can limit the dimensions of the bread product 50 that can be toasted within the toaster 10. The bread product 50 requires sufficient space 47 to fall from the conveyor 12 and to slide below the conveyor 12 along the discharge ramp 24. and has been found by the inventors to be particularly limiting in currently available toasters for toasting elongated or oblong buns, for example, hoagie or submarine sandwich buns.

Typically, a bread product 50 must be placed on the conveyor 12 in an orientation wherein the bread product fits within a width (c) of the conveyor. If the bread product is elongated in a length dimension (1), and that length dimension is greater than the conveyor width (c), then the bread product must be oriented on the conveyor 12 such that the longer length dimension is in the direction of movement of the conveyor. Similarly, the length dimension is oriented transverse to the width dimension (c) of the conveyor. However, if the space 47 is not sufficiently large to accommodate the length dimension (1), the bread product 50 can become stuck between the conveyor 12, back wall 30 and the discharge ramp 24. Toasters 10 disclosed herein solve this and other problems identified in conveyor toasters to improve the flexibility, throughput, and/or toasting consistency.

The toaster 10 includes a graphical display 32, represented in both physical and schematic form, that is operated by a controller 34 to present a graphical user interface (GUI) 36. In an example, the graphical display 32 is a touch-sensitive graphical display and therefore is operable to receive user inputs in response to prompts presented by the GUI 36. The GUI exemplarily includes input options for operation of Lane 1 38A and Lane 2 38B. The GUI 36 operates to visually present a plurality of control options for each lane, including but not limited to heat source temperature/output/energy and conveyor speed. In a further example, these heat source and conveyor settings may be pre-stored or pre-programmed as a plurality of "recipes" for the toasting of various bread products and/or other foods. Through experimentation or preference, the recipe may define a combination of toaster settings that achieves a customer desired or expected toasting condition on a particular type of bread product. The toaster 10 may be programmed with recipes, for example, but not limited to white bread slices, sourdough bread slices, English muffins, bagels, croissants, hamburger buns, or others.

The toaster 10 exemplarily includes the controller 34, shown schematically in FIG. 1. It will be recognized that the controller 34 is exemplarily any of a variety of known controller circuits, integrated circuits, microcontrollers, microprocessors, and associated circuitry. The controller 34 may exemplarily include a central processing unit (CPU) and integrated memory in the form of a computer-readable medium (CRM) 44, although in embodiments the computer-readable medium 44 comprising the memory may be a separate component or communicatively connected to the controller 34 within the toaster. The controller 34 exemplarily includes a processor that accesses software or firmware in the form of computer-readable code stored on the non-transient computer-readable medium as either integrated memory or external memory. The processor executes the computer-readable code as an instruction set to carry out the functions as described herein, including the input receipt, calculations, and outputs as will be described. The CRM 44 exemplarily further stores the algorithms and models as referred to herein in relation to, for example, energy decay, energy loss, or energy accumulation. In still further examples, it will be recognized that variables, constants, or correction factors may further be stored in the CRM 44 for use in the methods as described herein. While some models or algorithms may be defined as equations, it will be recognized that others may be defined as look-up tables with associated values based upon input variables. Some models or algorithms stored in the CRM 44 may be empirically determined through a calibration process and testing of the toaster unit before operational use. Other models or algorithms may be empirically refined through calibration or testing of the toaster unit.

The toasting effect on a piece of bread is dependent upon the physical qualities of the bread, the heat energy output from the heat source(s) 20 and the time that the bread product is exposed to the heat energy. The heat energy output from the heat sources (20) is a function of the energy input to the heat source. The time that the bread product is exposed to the heat is determined by the speed at which the conveyor 12 advances. A speed of the conveyor 12 may be directly related to a time that the bread product is toasted. Thus, with independently operable conveyors 12, the conveyors 12 can be operated at different speeds to provide toasting of two or more different baked products simultaneously with a single toaster 10. The controller 34 is exemplarily connected to conveyor motors 46, which are operably connected to the conveyors 12. Each motor 46 is respectively connected to a drive gear 31 on the drive shaft 19 by a drive chain (not depicted) to transfer motive output from the motor 46 to the conveyor 12. The conveyor motors 46 exemplarily receive control signals from the controller 34 indicative of the speed at which the motor 46 advances a respective conveyor 12. In an example, the controller 34 may receive inputs for operation of one of the lanes 22A of the toaster to continuously toast a most frequently used menu item, for example, hamburger buns, while the other lane is configured to operate to be frequently changed by a user to toast less frequently ordered bread products. In such an example, the graphical user interface may be configured to receive separate selections of operational recipes at which to operate each lane 22A, 22B of the toaster 10. As previously noted, one lane may be operated to continuously toast a most frequently used bread product, while the user selects a recipe on the GUI 36 more frequently to change the operation of the other conveyor and heat source settings to accommodate other toasting conditions.

In a further example, the controller 34 may operate to control the speed of one or both of the conveyors based upon a measured temperature within the toaster and/or a temperature setpoint of the toaster and/or an energy output of the heat source(s) 20. Such examples recognize that a longer time (slower conveyor speed) is needed to toast a bread product if the temperature and/or heat source output is lower, while a shorter time (faster conveyor speed) is needed to toast a bread product if there is greater temperature and/or energy output from the heat source. Toasting recipes for different bread products may be defined in terms of a conveyor speed for a given heat source output or toaster temperature. Therefore, the controller 34 may operate the conveyors 12 at two different speeds to accommodate toasting of two different types of bread products.

The presently disclosed toaster 10, however, is further adapted as described herein to accommodate a wider range of bread product sizes, increased throughput, and/or toasting consistency by providing structure and operation for the toaster 10 to operate both conveyors 12 in synchronicity. The toaster 10 includes the opening 14 in the housing 16 to accommodate both conveyors 12 there through. An open interior 40 of the housing 16 is obstruction-free between the conveyors 12. In still further examples, the upper (e.g. and lower) heat sources 20 are spaced apart, for example, a smaller distance in the width dimension than which the conveyors 12 are similarly spaced. That is, the heat sources 20 are exemplarily closer to one another in the width dimension than the conveyors 12 are in the width dimension. These adaptations enable the toaster 10 to accommodate elongated or ovular-shaped bread products across both conveyors 12 for toasting by the toaster 10. These adaptations to the toaster, as described herein, may also enable the toaster 10 to provide increased toasting throughput.

Figure 3A:
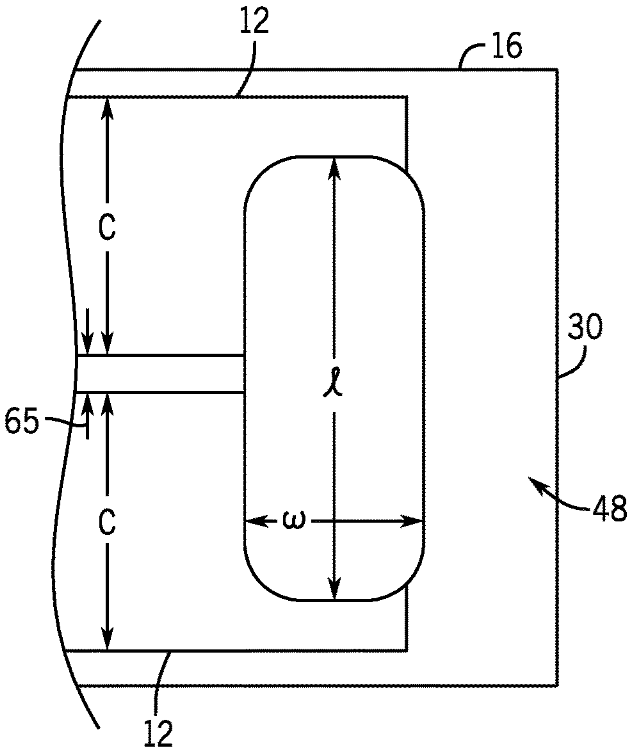
FIGS. 3A and 3B depict an example of the presently disclosed toaster with an elongated bread product.
Figure 3B:
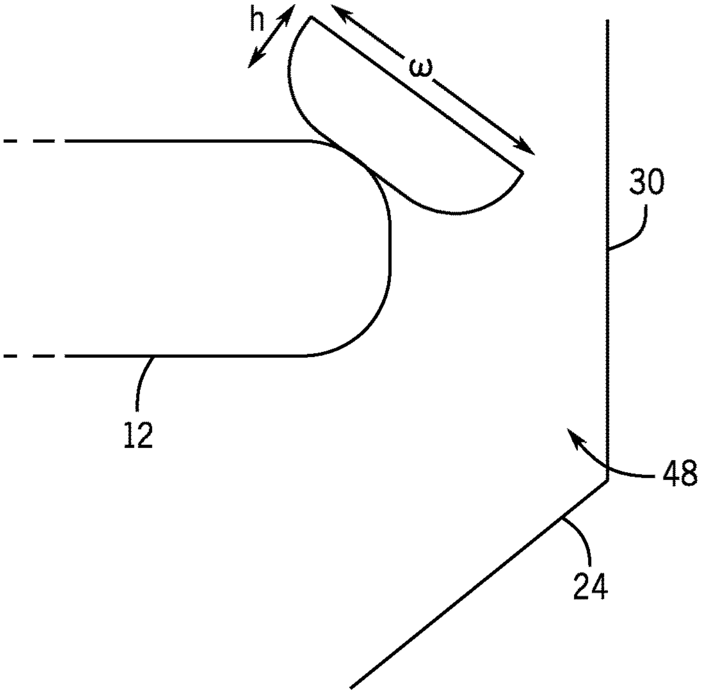

FIGS. 3A and 3B show one accommodation of the bread product 50 as disclosed herein. The bread product 50 extends across both conveyors 12, wherein the length dimension (l) of the bread product 50 is greater than the conveyor width (c), but less than the combined distance across the two conveyors 12. The smaller width dimension (w) of the bread product is exemplarily smaller than conveyor width (c) and is readily accommodated within the space 47 for the bread product 50 to be received from the conveyors 12 and deposited onto the discharge ramp 24.

In a still further example, the distance from an end of the conveyor 12 to the back wall 30 may be less than a width (c) of the conveyor. In a still further example, the distance from the end of the conveyor 12 to the back wall 30 may be the same as the width (c) of the conveyor.

In an example, the GUI 36 operates to prompt a user input of an instruction to use synchronous toasting to toast an elongated bread product, particularly a bread product. In an example, this user input may be received at either of lane sections 38A, 38B of the GUI. The controller 34 receives the user input of synchronous toasting and provides control signals to the conveyor motors 46 to advance both conveyors 12 at the same speed. The controller 34 further provides control signals to one or more of the heat sources 20 to operate the heat sources in matched conditions between horizontally adjacent heat sources 20 within the toaster 10. The toaster is operable with the control signals provided from the controller 34 to these components to accept an elongated bread product on the loading zone 18 across both conveyors 12 and to move the bread product evenly with the combined operation of the conveyors 12 past the at least two heat sources 20 to toast the elongated bread product.

Upon receipt of a user input to either of the lane sections 38A, 38B of the GUI 36 to operate again in independent mode, the controller 34 operates to return the conveyors 12 and heat sources 20 to asynchronous operation. In one example, the operation returns to the operational conditions for the first lane and the second lane immediately prior to entering the synchronous mode of operation. In an further example, the lane that received a new user input, operates accordingly to that input while, the other lane either operates according to the settings of the synchronous operation or reverts back to the operational settings of the operation prior to the synchronous operation.

Figure 4:
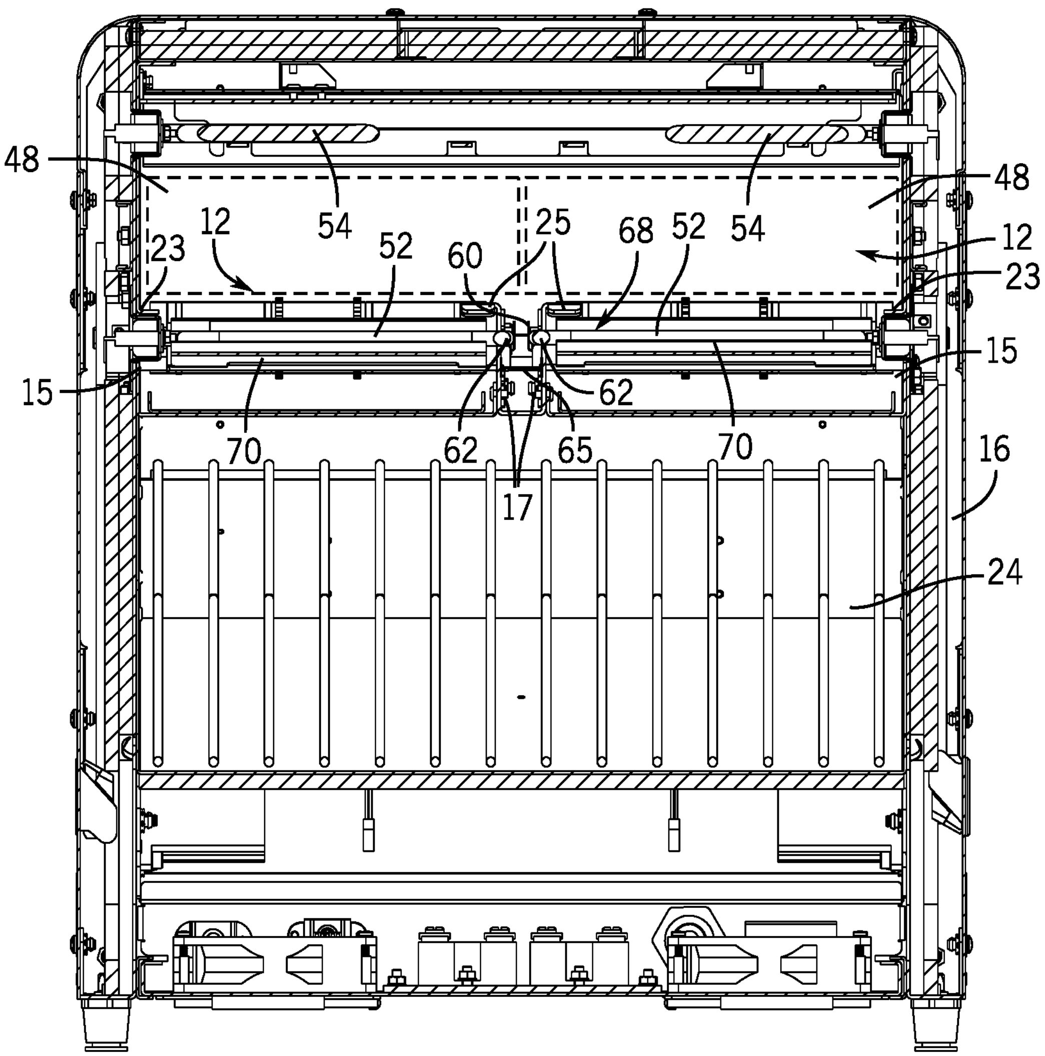
FIG. 4 is a front sectional view taken along line 4-4 of FIG. 1.
Figure 5:
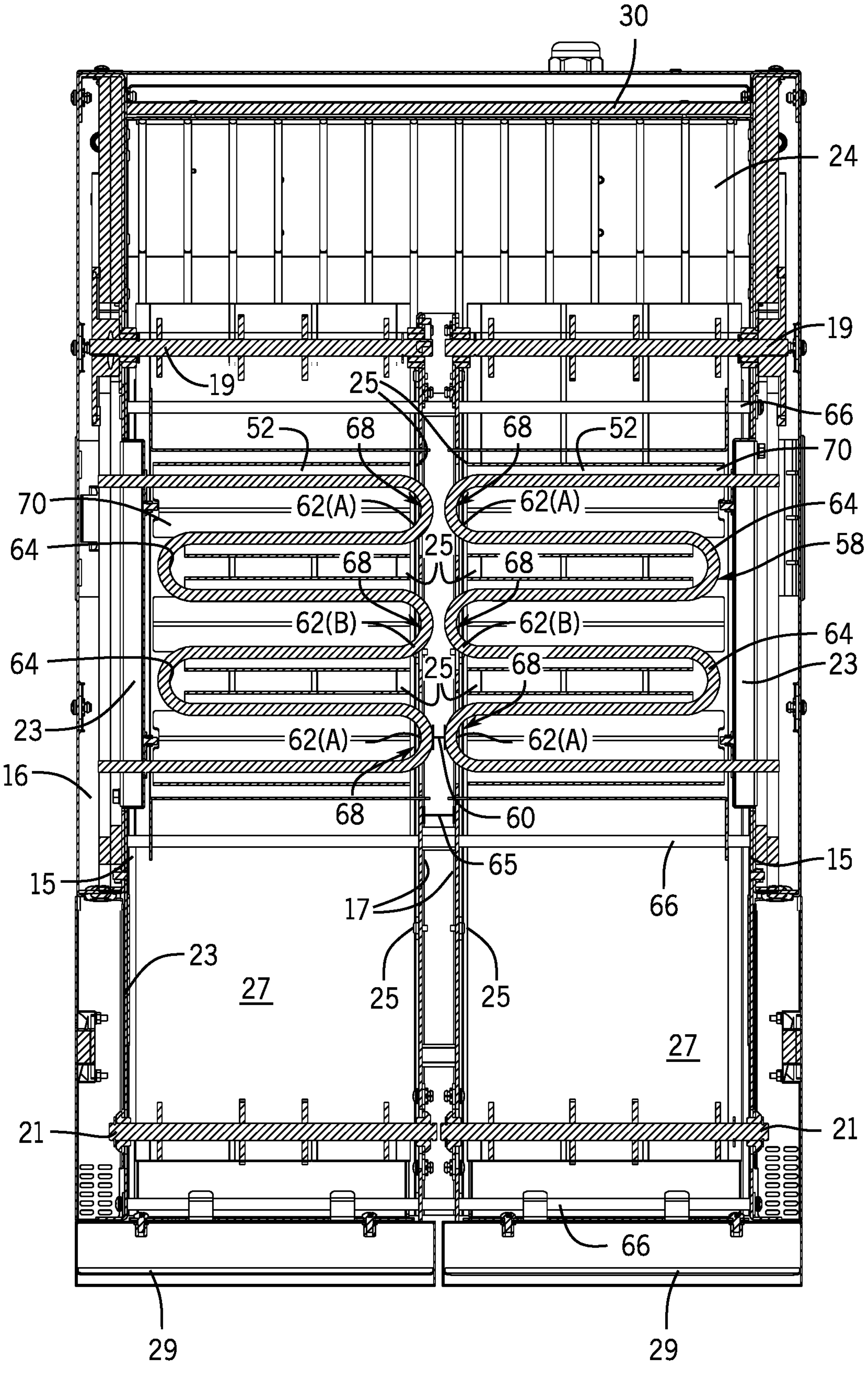
FIG. 5 is a top sectional view taken along line 5-5 of FIG. 1.
Figure 7:
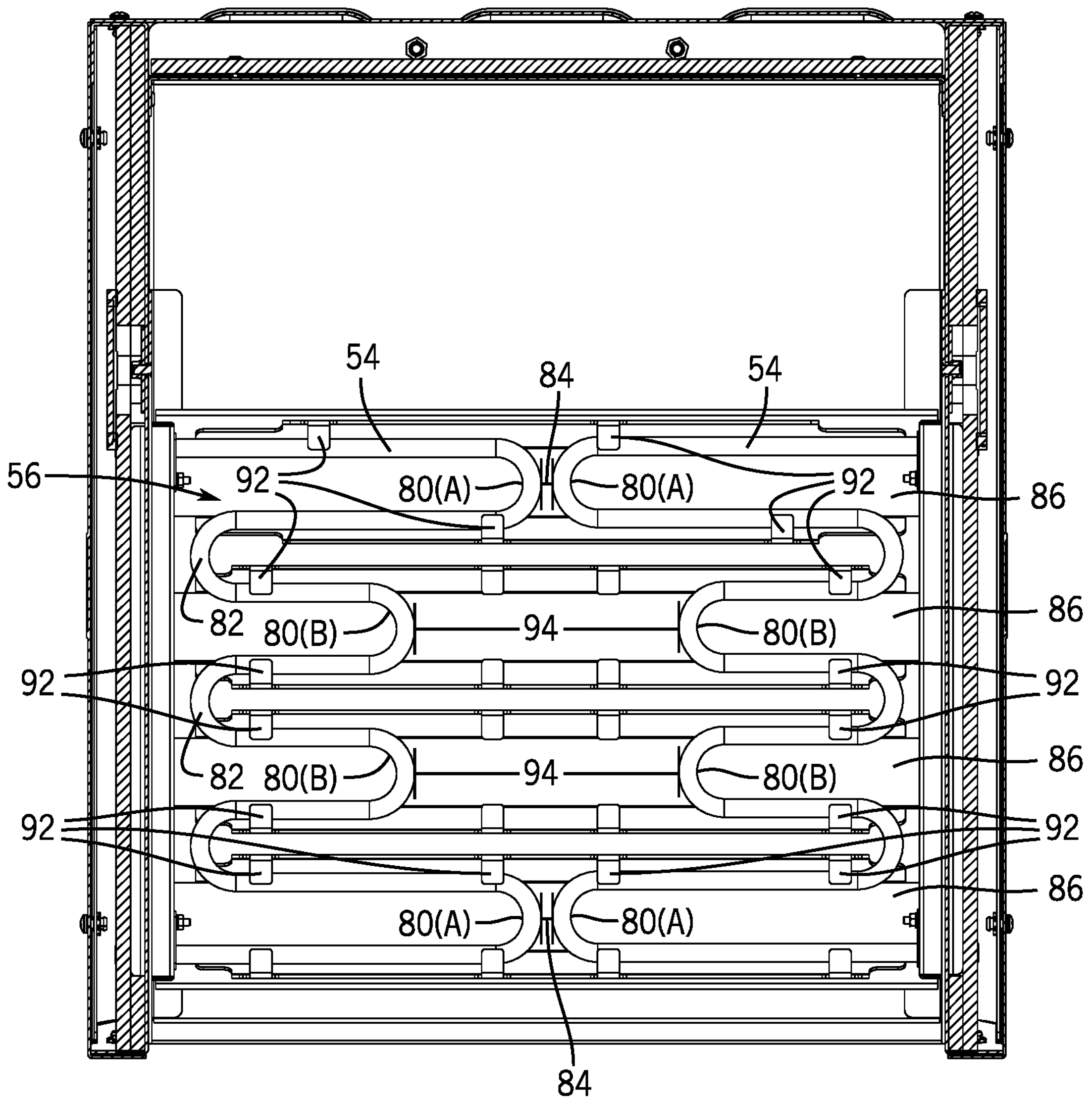
FIG. 7 is a bottom sectional view taken along line 7-7 of FIG. 1.

FIG. 4 is a front sectional view taken along line 4-4 in FIG. 1. FIG. 5 is a top sectional view taken along line 5-5 of FIG. 1. FIG. 5 further has the belt 13 removed for visibility. FIG. 7 is a bottom sectional view taken along line 7-7 of FIG. 1. The toaster 10 includes an upper heating assembly 56 which includes the upper heat sources and a lower heating assembly 58 that includes the lower heat sources. The heat sources direct heat energy into toasting zones 48 above the respective conveyors 12 between the heat sources. At least a portion of the lower heating assembly 58 is positioned intermediate the conveyors 12. The conveyors 12 are shown with the lower heat sources being electric heating elements 52, for example, CALROD® elements. In examples, the heating elements 52 may exemplarily be 980 W or 680 W and may have a diameter between 0.260 in. and 0.315 in. Variations in these ranges will be recognized based upon the present disclosure. The upper heating sources of the upper heating assembly 56 are also exemplarily electric heating elements 54, and are respectively positioned above the conveyors 12. In examples, the heating elements 54 may exemplarily be 1500 W or 1800 W and may have a diameter between 0.315 in and 0.375 in. Variations in these ranges will be recognized based upon the present disclosure. Thus in examples, the heating elements 52 may have a lower wattage and/or smaller diameter than heating elements 54.

Figure 6:
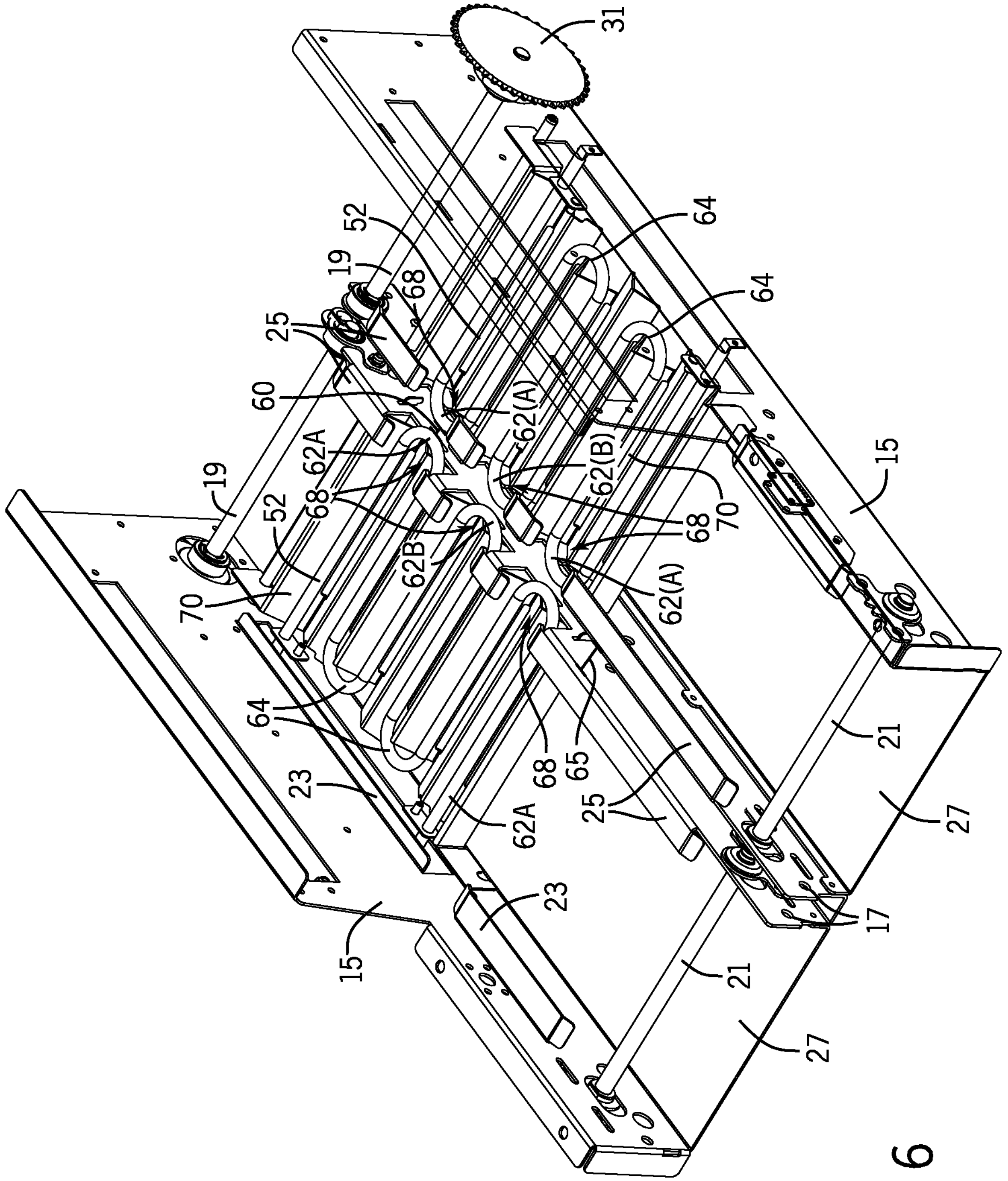
FIG. 6 is an isolated view of the lower heating assembly.

The lower heating assembly 58 which is shown in an isolated view in FIG. 6, includes the electric heating elements 52 which extend interior to the toaster from the side supports 15. The heating elements 52 include a plurality of interior loops 62 and a plurality of exterior loops 64. The exterior loops terminate interior of the side supports 15. At least some of the interior loops 62 extend through the interior supports 17 towards each other stopping with a lateral gap 60 between interior extents of the electric heating elements 52. In examples, the gap 60 measures 0.25 in., 0.25+/−0.1 in., 0.25 in.-0.5 in., or 0.25 in.-1.0 in. Because the electric heating elements 52 extend through the interior supports 17, the gap 60 is smaller than the distance of reference 65 between the interior supports 17. While each of the interior loops 62 are shown in FIGS. 5 and 6 to terminate at the same distance to the interior of the toaster, it will be recognized that in other examples, some interior loops may extend different distances than other interior loops 62. In an example, end interior loops 62(A) extend the full distance represented by the electric heating elements 52, while intermediate interior loops 62(B) only extend a portion of the distance into the interior of the toaster, as will be explained in further detail herein.

The interior supports 17 include a series of apertures 68. The interior loops 62 extend through the apertures 68 to end at locations interior of the respective interior supports 17. That is, the interior loops 62 of the heating elements 52 terminate at locations between the two interior supports 17 with the gap 60 there between. The extension of the interior loops 62 into the space between the interior supports 17 helps to evenly distribute heat energy across the combined widths of the conveyors 12. The apertures 68 are exemplarily open in the upward direction, towards the upper side of the belt 13 upon which the bread products rest. The upwardly open apertures 68 further help to evenly distribute heat energy across the combined widths of the conveyors 12. Heat energy distributed upwardly between the conveyors 12 toasts a portion of any bread product that extends between the two conveyors 12 and across both of the toasting zones 48. An example of this is the aforementioned elongated bread products that are positioned to extend onto both conveyors 12 and within both toasting zones 48 in FIG. 4. This may provide an even toasting of the elongated bread products as opposed to a lesser-toasted stripe coinciding with the distance of reference 65 between the interior supports 17 and/or the conveyors 12.

The interior support flanges 25 are exemplarily located between each aperture 68 and at each end angle inward towards the aperture 68 and/or interior loop 62. These angled portions of the interior support flanges 25 help to take up engagement with the belt 13 as the belt passes unsupported over the aperture 68. Support rods 66 extend through both of the side supports 15 and both of the interior supports 17 providing structure and rigidity to the support components of the lower heating assembly 58. Lower baffles 70 are positioned below the heating elements 52. The lower baffles 70 reflect heat energy from the heating elements 52 upwards into the toasting zone 48 above the conveyor 12.

Figure 8:
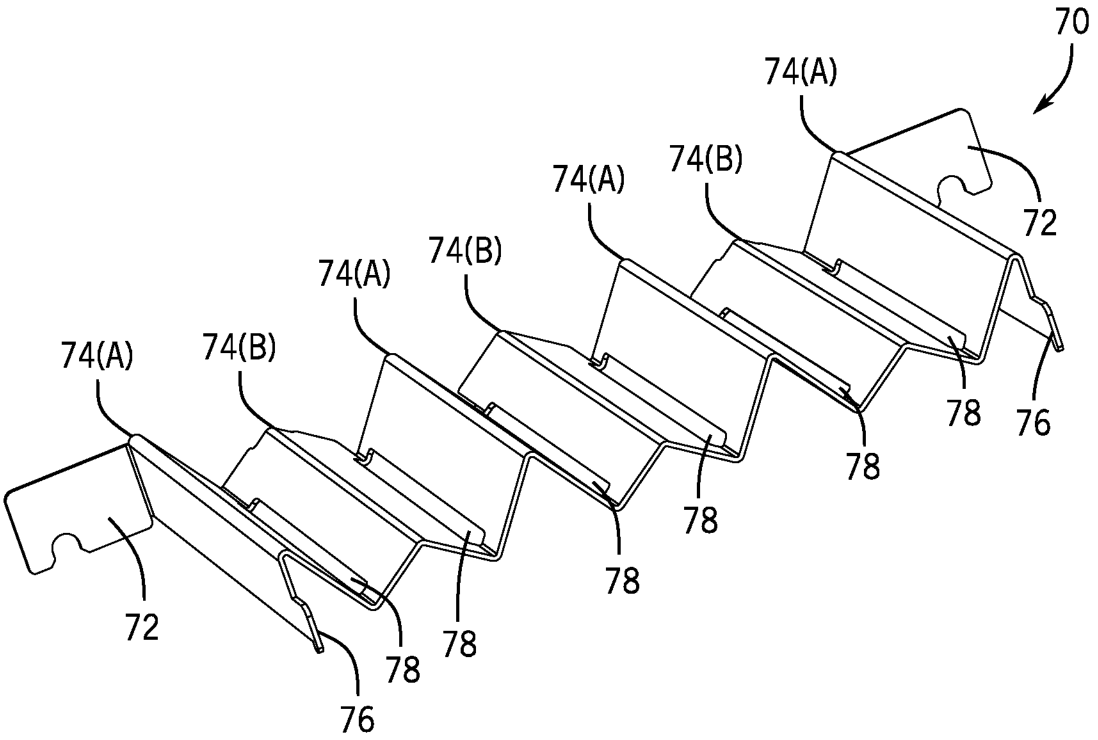
FIG. 8 is an isolated view of a lower baffle.

An isolated example of a lower baffle 70 is shown in FIG. 8. The lower baffle 70 includes tabs 72 which are shaped to engage over supports rods 66 extending between the side supports 15 and the interior supports. The lower baffle 70 further includes fingers 76 which extend through slots in the interior supports 17 to engage and rest upon the interior supports 17. The lower baffle 70 includes a plurality of ridges 74. The ridges 74 include peaked ridges 74(A) and shallow ridges 74(B). In the example depicted, the peaked ridges 74(A) and the shallow ridges 74(B) alternate. The peaked ridges 74(A) and the shallow ridges 74(B) exemplarily have the same width dimension, but the peaked ridges 74(A) extend at a sharper angle, and thus reach a greater vertical height compared and the shallow ridges 74(B) that have a flatter angle and a smaller vertical height. The lower baffle 70 is positioned such that the shallow ridges 74(B) are interior of the interior loops 62 while the peaked ridges 74(A) are interior of the exterior loops 64. A slot 78 extends between each of the adjacent peaked ridges 74(A) and the shallow ridges 74(B).

FIG. 7 is a bottom sectional view of the toaster 10 showing the upper heating assembly 56 including the electric heating elements 54. The electric heating elements 54 are similar to the previously described electric heating elements 52, and the description thereof applies to the heating elements 54 as well. It will be recognized that in examples, the heating elements 54 as shown and described may be used as the heating elements 52 and that the heating elements 52 as shown and described may be used as the heating elements 54. The heating elements 54 include a series of interior loops 80 and exterior loops 82. A lateral gap 84 exists between the innermost extents of the heating elements 54, the lateral gap 84 may exemplarily be any of the distances as previously described with respect to gap 60. It will be recognized that the lateral gap 84 and the gap 60 may be the same distance within an embodiment or may be different distances within an embodiment. End interior loops 80(A) extend the full distance towards the interior of the toaster as represented by the electric heating elements 54 and are separated by the lateral gap 84, while intermediate interior loops 80(B) only extend a portion of the distance into the interior of the toaster and are laterally separated by a gap 94. The gap 94 is thus a greater lateral distance than the distance of reference 65, or the distances of gaps 60 or 84. While the gaps 94 are depicted as being the same between the two intermediate interior loops 80(B), in examples, the gaps 94 may be different. While the heating elements 54 are depicted as each having two intermediate interior loops 80(B), it will be recognized that other examples may include other numbers of intermediate interior loops 80(B) including one, for example as shown with heating element 52, or more than two, all while remaining within the scope of the present disclosure. In examples wherein gaps 94 are present between the at least one intermediate loop of the heating elements 54 and the heating elements 52, the distances of those gaps 94 may be the same or may be different between the heating elements 52 and the heating elements 54.

While the toaster 10 disclosed herein distributes heat into the region between the conveyors 12, it has further been observed that too much heat can accumulate in the center of the toasting zone 48. Without any physical barrier between the conveyors two further use cases can occur. If both conveyors are operated at the same speed and with the same heat source controls, more units of bread product (e.g. English muffins or bagels) may be loaded into the toaster 10 at a time since the bread product can be staggered across the combined widths of the conveyors as opposed to sequential placement of bread product on each conveyor individually. Furthermore, without a physical barrier to guide bread product placement on a conveyor, users may place bread product read product off-center on the conveyor 12, that is a placement hedged towards either the center line of the toaster or towards the outer sides. In any of these cases, even distribution of heat across the width of the interior provides even toasting of bread products independent of the positional placement on a conveyor 12 or between conveyors 12.

The intermediate interior loops 80(B) only extend a portion of the distance into the interior of the toaster. This locates the intermediate interior loops 80(B) of the heating element 54 away from the center of the toasting zone and evens the distribution of heat across the width of the toasting zone 48. As previously noted, while the lower heating element 52 is not so shown, it is contemplated that in other embodiments, the lower heating element 52 also uses similar construction as shown in FIG. 7 for the intermediate interior loops 62(B).

Figure 9:
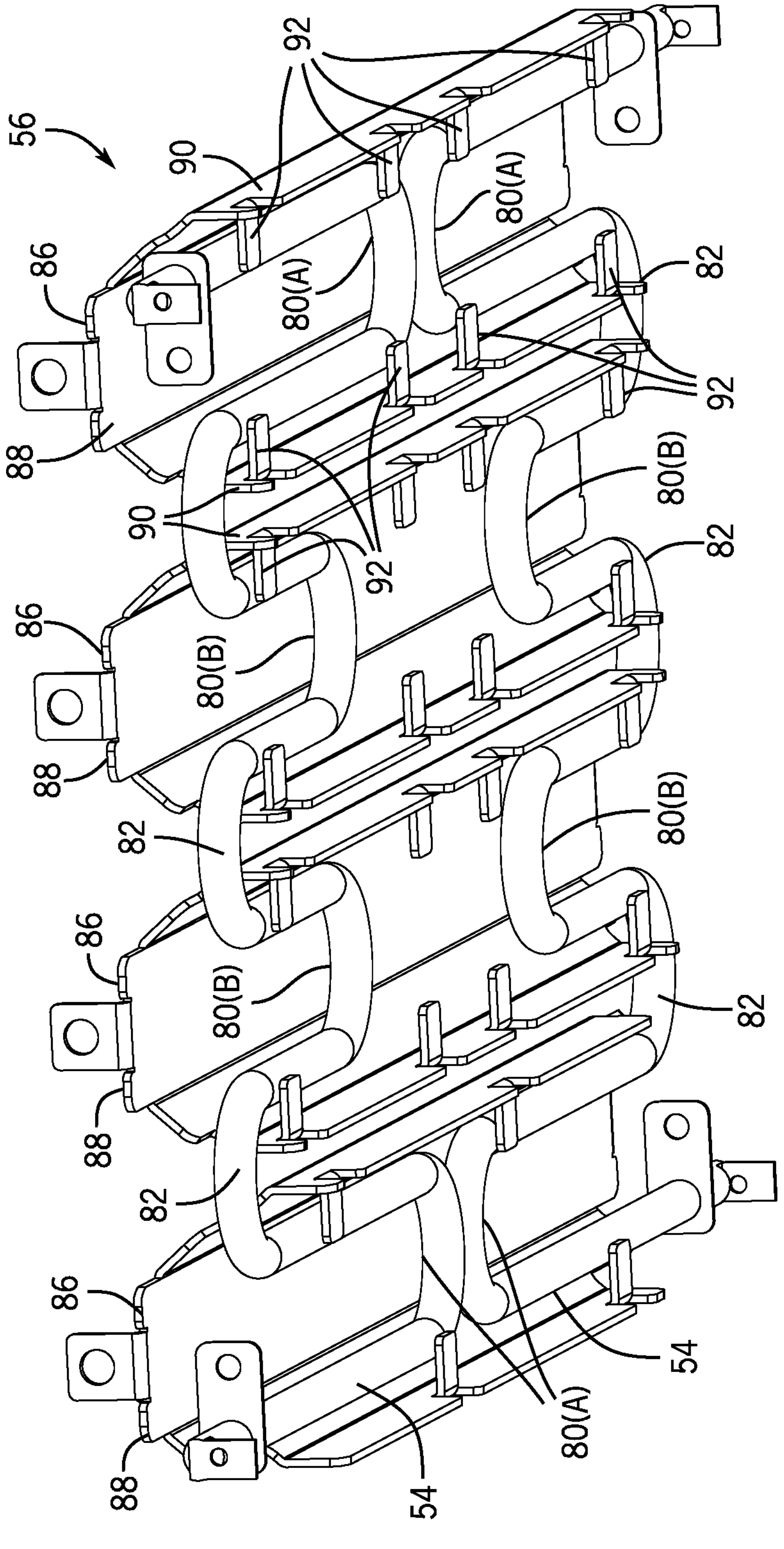
FIG. 9 is an isolated view of an upper heating assembly.

FIG. 9 is an isolated view of the heating elements 54 and the upper baffles 86. An upper baffle 86 extends above and across each interior loop 80 of the two heating elements 54. The exterior loops 82 pass between adjacent upper baffles 86. The upper baffles reflect heat energy from the heating elements 54 into the toasting zone 48. The baffles 86 have a trapezoidal upper profile 88 and sidewalls 90 that extend vertically lower than the heating elements 54. Tabs extend inward from the sidewalls interior of the baffles and below the heating elements 54. These tabs may provide supplemental support to maintain the position of the heating elements 54.

Citations to several references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A toaster for toasting a bread product comprising:

a first conveyor configured to receive the bread product thereon and move the bread product through a first toasting zone;

a first heat source positioned to direct heat energy into the first toasting zone;

a second conveyor configured to receive the bread product thereon and move the bread product through a second toasting zone, wherein the first and second conveyors are coplanar and laterally spaced apart by a first distance and are configured to operate in a same direction of travel;

a second heat source positioned to direct heat energy into the second toasting zone wherein interior extents of the first heat source and the second heat source are laterally spaced apart by a second distance, the second distance being less than the first distance; and a controller configured to operate the first conveyor to at least a first speed and a second speed and configured to operate the second conveyor to at least the first speed and the second speed.

2. The toaster of claim 1, wherein the first and second heat sources are electric heating elements which each comprise a plurality of interior loops and a plurality of exterior loops.

3. The toaster of claim 2, wherein the plurality of interior loops comprise first and second end interior loops and at least one intermediate interior loop.

4. The toaster of claim 3, wherein the end interior loops of the first and second heat sources are laterally spaced apart by the second distance.

5. The toaster of claim 4, wherein the at least one intermediate interior loop of the first and second heat sources are laterally spaced apart by a third distance, the third distance being greater than the first distance and the second distance.

6. The toaster of claim 1, wherein the first and second conveyors each comprise a drive shaft, a driven shaft, and a continuous belt.

7. The toaster of claim 1, wherein the first heat source is positioned interior of the first conveyor and the second heat source is positioned interior of the second conveyor.

8. The toaster of claim 7, further comprising:

a third heat source positioned above the first conveyor; and a fourth heat source positioned above the second conveyor.

9. The toaster of claim 8, wherein the third and fourth heat source are laterally spaced apart by the second distance.

10. The toaster of claim 7, wherein the first, second, third, and fourth heat sources are electric heating elements which each include a plurality of interior loops and a plurality of exterior loops.

11. The toaster of claim 10, wherein the plurality of interior loops of the electric heat sources of the third and fourth heat sources comprise first and second end interior loops and at least one intermediate interior loop;

wherein the end interior loops of the first and second heat sources are laterally spaced apart by the second distance; and wherein the at least one intermediate interior loop of the third and fourth heat sources are laterally spaced apart by a third distance, the third distance being greater than the first distance and the second distance.

12. The toaster of claim 10, wherein the plurality of interior loops of each of the electric heat sources comprise first and second end interior loops and at least one intermediate interior loop;

wherein the first and second end interior loops of the first heat source are laterally spaced apart from the first and second end interior loops of the second heat source by the second distance;

wherein the first and second end interior loops of the third heat source are laterally spaced apart from the first and second end interior loops of the fourth heat source by a third distance;

wherein the at least one intermediate interior loop of the first heat source is laterally spaced apart from the at least one intermediate interior loop of the second heat source by a fourth distance, the fourth distance being greater than the first, second, and third distances; and wherein the at least one intermediate interior loop of the third heat source is laterally spaced apart from the at least one intermediate interior loop of the fourth heat source by a fifth distance, the fifth distance being greater than the first, second, and third distances.

13. The toaster of claim 1, further comprising:

first and second side supports; and first and second interior supports;

wherein the first conveyor is connected to the first side support and the first interior support and the second conveyor is connected to the second side support and the second interior support.

14. The toaster of claim 13, wherein first and second interior supports are a unitary construction.

15. The toaster of claim 13, wherein the first and second heat sources are electric heating elements each comprising a plurality of interior loops and a plurality of exterior loops;

wherein the first interior support comprises a first plurality of apertures, wherein the interior loops of the first heat source extend interior of the first interior support though the first plurality of apertures; and wherein the second interior support comprises a second plurality of apertures, wherein the interior loops of the second heat source extend interior of the second interior support through the second plurality of apertures.

16. The toaster of claim 15 wherein the first plurality of apertures are open through the first interior support towards the first conveyor from the first heat source and the second plurality of apertures are open through the second interior support towards the second conveyor from the second heat source.

17. The toaster of claim 1, further comprising a housing defining an open interior and an opening through the housing, wherein the first and second conveyors extend within the open interior of the housing and extend exterior of the housing through the opening.

18. The toaster of claim 17, wherein the open interior of the housing is unobstructed between the first toasting zone and the second toasting zone.

19. A toaster for toasting a bread product comprising:

a first conveyor configured to receive the bread product thereon and move the bread product through a first toasting zone;

a first electric heating element extending interior of the first conveyor and comprising a first plurality of interior loops and a first plurality of exterior loops;

a second conveyor configured to receive the bread product thereon and move the bread product through a second toasting zone, wherein the first and second conveyors are coplanar and laterally spaced apart by a first distance and are configured to operate in a same direction of travel;

a second electric heating element extending interior of the second conveyor and comprising a second plurality of interior loops and a second plurality of exterior loops, wherein the first plurality of interior loops are laterally spaced apart from the second plurality of interior loops by a second distance, the second distance being less than the first distance;

a third electric heating element positioned above the first conveyor and comprising a third plurality of interior loops comprising two end interior loops and at least one intermediate interior loop, the third electric heating element comprising a third plurality of exterior loops; and a fourth electric heating element positioned above the second conveyor and comprising a fourth plurality of interior loops comprising two end interior loops and at least one intermediate interior loop, the fourth electric heating element comprising a fourth plurality of exterior loops, wherein the at least one intermediate interior loop of the third electric heating element is laterally spaced apart from the at least one intermediate interior loop of the fourth electric heating element by a third distance, the third distance being greater than the first distance and the second distance.

20. The toaster of claim 19, wherein the first plurality of interior loops comprise two end interior loops and at least one intermediate interior loop, and the second plurality of interior loops comprise two end interior loops and at least one intermediate interior loop;

wherein the at least one intermediate interior loop of the first electric heating element is laterally spaced apart from the at least one intermediate interior loop of the second electric heating element by a fourth distance, the fourth distance being greater than the first distance and the second distance.

* * * * *